(12) United States Patent
Ishimaru et al.

(10) Patent No.: US 8,977,424 B2
(45) Date of Patent: Mar. 10, 2015

(54) FAULT DIAGNOSIS METHOD AND FAULT DIAGNOSIS DEVICE

(75) Inventors: Kenji Ishimaru, Tokyo (JP); Yudai Okabe, Tokyo (JP); Hiroshi Ito, Tokyo (JP); Kusuo Okazaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/881,183

(22) PCT Filed: May 18, 2011

(86) PCT No.: PCT/JP2011/061428
§ 371 (c)(1),
(2), (4) Date: Apr. 24, 2013

(87) PCT Pub. No.: WO2012/056754
PCT Pub. Date: May 3, 2012

(65) Prior Publication Data
US 2013/0218401 A1    Aug. 22, 2013

(30) Foreign Application Priority Data

Oct. 28, 2010  (JP) ................................. 2010-242521
Oct. 28, 2010  (JP) ................................. 2010-242525

(51) Int. Cl.
*G01M 17/00* (2006.01)
*G06F 7/00* (2006.01)
(Continued)

(52) U.S. Cl.
CPC .............. *G06F 17/00* (2013.01); *G07C 5/0816* (2013.01); *G07C 5/008* (2013.01); *G07C 2205/02* (2013.01)
USPC ....................................................... 701/31.4

(58) Field of Classification Search
CPC .. G07C 5/008; G07C 2205/02; G07C 5/0816; G07F 17/00

USPC ........................................................ 701/31.4
See application file for complete search history.

(56) References Cited

U.S. PATENT DOCUMENTS 5,491,631 A  *  2/1996  Shirane et al. ................ 701/29.6
7,233,846 B2    6/2007  Kawauchi et al.
(Continued)

FOREIGN PATENT DOCUMENTS

CN           1581000 A      2/2005
JP        01-209334 A      8/1989
(Continued)

OTHER PUBLICATIONS

Japanese Notice of Allowance issued over corresponding Japanese Patent Application No. 2010-242521 dated Jun. 25, 2013.
(Continued)

*Primary Examiner* — Mary Cheung
*Assistant Examiner* — Anne Mazzara
(74) *Attorney, Agent, or Firm* — Squire Patton Boggs (US) LLP

(57) ABSTRACT

A fault diagnosis device and a fault diagnosis method read a diagnostic trouble code from an Electronic Control Unit to the fault diagnosis device, and display a work guide screen for guiding work in accordance with the read diagnostic trouble code. The work guide screen includes an entire work flowchart consisting of a plurality of work items for identifying a fault occurrence location at which the fault event corresponding to the diagnostic trouble code is caused, and includes an entire work display area in which a work item selected among the plurality of work items is highlighted and a concrete work display area in which concrete work details about the highlighted work item are indicated.

14 Claims, 14 Drawing Sheets

(51) Int. Cl.
*G06F 19/00* (2011.01)
*G06F 17/00* (2006.01)
*G07C 5/08* (2006.01)
*G07C 5/00* (2006.01)

(56) References Cited

U.S. PATENT DOCUMENTS

| | | | |
|---|---|---|---|
| 7,444,216 | B2 | 10/2008 | Rogers et al. |
| 2001/0002450 | A1 | 5/2001 | Mizutani et al. |
| 2006/0142908 | A1* | 6/2006 | Grier et al. .................. 701/29 |
| 2007/0093947 | A1* | 4/2007 | Gould et al. .................. 701/29 |
| 2007/0270980 | A1 | 11/2007 | Lipner et al. |
| 2009/0055741 | A1 | 2/2009 | Maeda et al. |
| 2010/0023203 | A1* | 1/2010 | Shibi ............................ 701/33 |

FOREIGN PATENT DOCUMENTS

| | | |
|---|---|---|
| JP | 03-257509 A | 11/1991 |
| JP | 06-011419 A | 1/1994 |
| JP | 07-306123 A | 11/1995 |
| JP | 2001-154725 A | 6/2001 |
| JP | 2002-331884 A | 11/2002 |
| JP | 2005-301336 A | 10/2005 |
| JP | 2009-25951 A | 2/2009 |
| JP | 2009-537900 A | 10/2009 |
| JP | 2010-231591 A | 10/2010 |

OTHER PUBLICATIONS

Japanese Notice of Allowance issued over corresponding Japanese Patent Application No. 2010-242525 dated Jun. 25, 2013.
International Search Report and Written Opinion dated Jul. 12, 2011 corresponding to International Patent Application No. PCT/JP2011/061428.
Office Action dated Sep. 17, 2014, issued in corresponding Chinese Application No. 201180052482.X (partial English translation attached).

* cited by examiner

FIG. 5

DTC P0102:VOLTAGE OF AIRFLOW SENSOR CIRCUIT IS LOW

NOTES: BEFORE STARTING FAULT DIAGNOSIS,
RECORD ALL FROZEN DATA AND ONBOARD
SNAPSHOT DATA AND CONFIRM GENERAL
INFORMATION ABOUT FAULT DIAGNOSIS

| DESCRIPTION OF DTC | DTC WHOSE DISPLAY IS CONFIRMED | DTC WHICH IS CURRENTLY DISPLAYED | FROZEN DATA | STATE OF OBD |
|---|---|---|---|---|
| P0102 VOLTAGE OF AIRFLOW SENSOR CIRCUIT IS LOW | CONFIRM | CONFIRM | CONFIRM | FAILURE |

FIG. 6

1. REPEATABILITY TEST
   -1. TURN ON (II) IGNITION SWITCH AND
       WAIT FOR 2 SECONDS
   -2. CONFIRM FOLLOWING PARAMETERS

| SIGNAL | FAULT JUDGING THRESHOLD VALUE | | PRESENT STATE | |
|---|---|---|---|---|
| | VALUE | UNIT | VALUE | UNIT |
| AIRFLOW SENSOR | 0.1 OR SMALLER | g/s | 0 | g/s |

IS PRESENT STATE APPLICABLE TO FAULT JUDGING THRESHOLD VALUE?

- [YES] FAULT REPEATED. GO TO STEP 2.
- [NO] TRANSITORY FAULT, PRESENT SYSTEM IS GOOD. CONFIRM CONNECTION FAILURE BETWEEN AIRFLOW SENSOR AND ECU

142
2. INSPECT IG1 LINE FOR SHORT CIRCUIT BETWEEN
AIRFLOW SENSOR/INTAKE AIR TEMPERATURE SENSOR AND
NO. 12IMA (10A) FUSE
 -1. INSPECT FOLLOWING FUSE

FUSE NO. 12IMA
   LOCATION: FUSE/RELAY BOX BELOW DASHBOARD

146
IS FUSE NORMAL ? —150

152a— YES   IG1 LINE IS NOT GROUNDED. GO TO STEP 3 —154a

152b— NO   REPAIR SHORT-CIRCUITED IG1 LINE BETWEEN
           AIRFLOW SENSOR/INTAKE AIR TEMPERATURE
           SENSOR AND NO. 12IMA (10A) FUSE,         —154b
           REPLACE NO. 12IMA (10A) FUSE, AND
           INSPECT AFTER REPAIR

160

FIG. 8
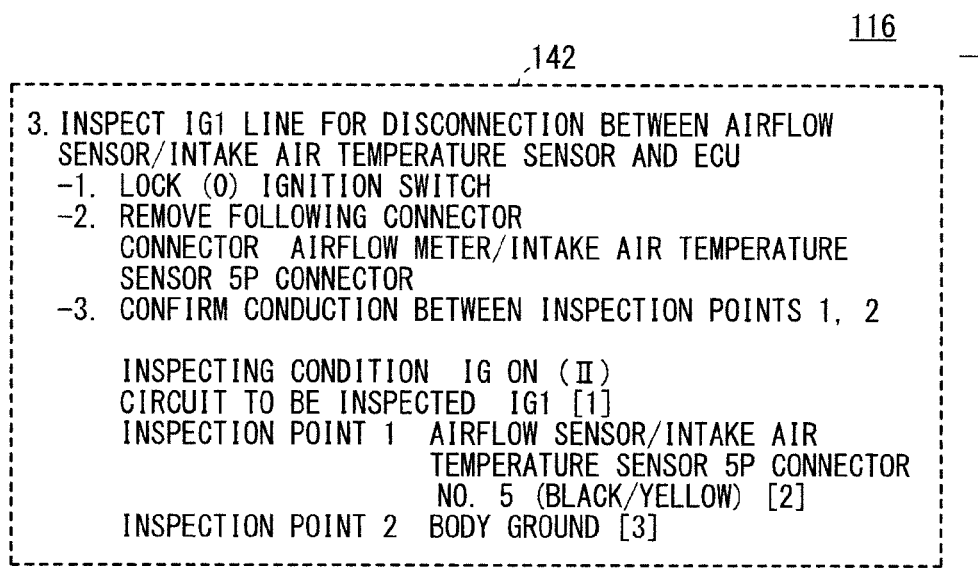
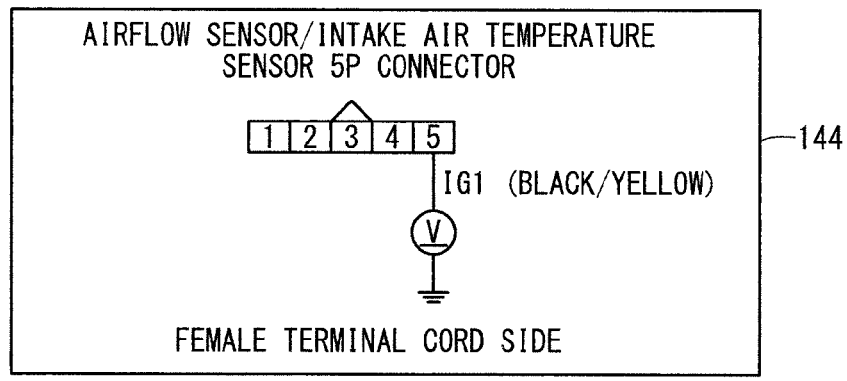
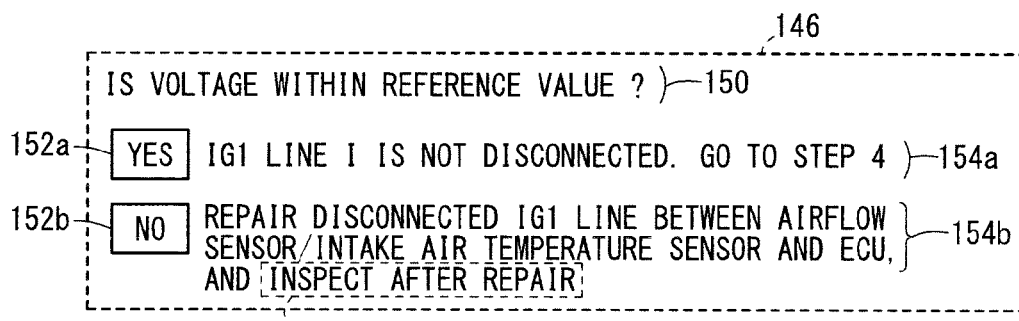

FIG. 9
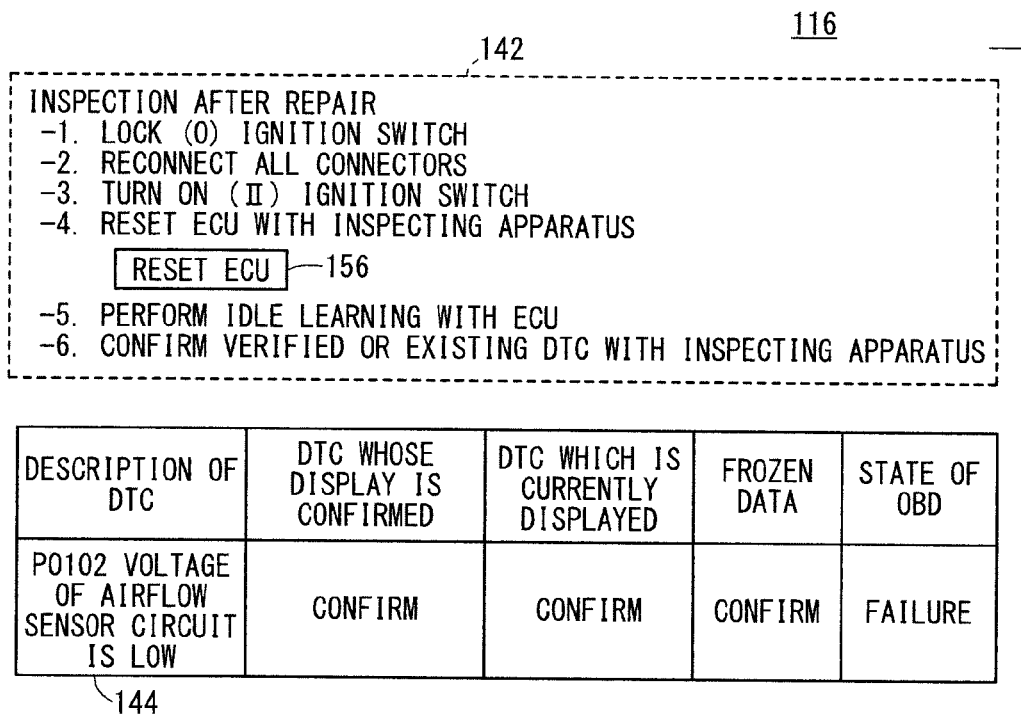
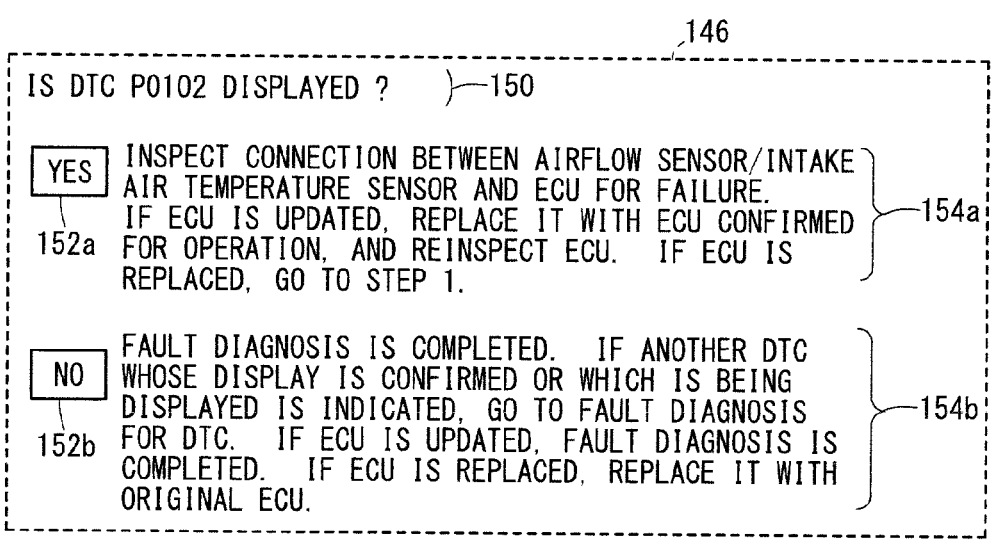

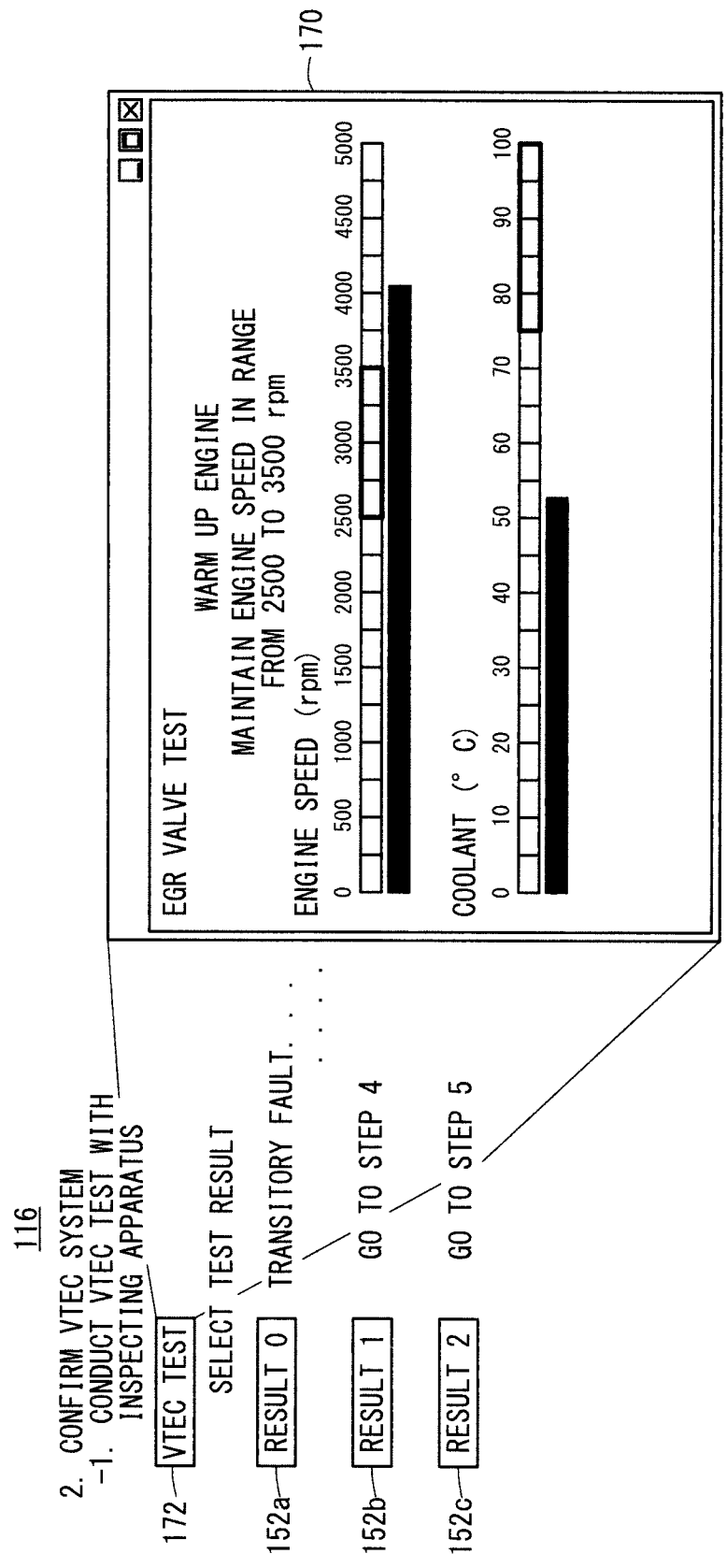

FAULT DIAGNOSIS METHOD AND FAULT DIAGNOSIS DEVICE

TECHNICAL FIELD

The present invention relates to a fault diagnosing method (fault diagnosis method) and a fault diagnosing apparatus (fault diagnosis device) connected to an electronic control unit mounted on a vehicle, for reading self-diagnosis result data stored in the electronic control unit into an external diagnosing apparatus, which serves as the fault diagnosing apparatus for diagnosing the vehicle for a fault. More particularly, the present invention relates to a fault diagnosing method and a fault diagnosing apparatus for performing a diagnostic process according to a fault diagnosing procedure displayed on a monitor screen.

BACKGROUND ART

When a fault occurs in the control system (electronic control unit (ECU), various sensors, etc.) of a vehicle, the driver recognizes the fault based on the occurrence of an abnormal symptom, lighting of a warning lamp, or the like, and brings the vehicle to a dealer or a repair shop.

The worker (technician) who is in charge of repairs uses an external diagnosing apparatus to read a diagnostic trouble code that was stored in the ECU of the faulty vehicle at the time that the fault occurred, thereby grasping a faulty event (e.g., in the event of an abnormal output value from a sensor, the content of the abnormal output value). Then, the worker identifies a faulty spot that is responsible for the faulty event by successively confirming whether or not components are normal based on a service manual or the like.

There have been developed diagnosing apparatus for use in identifying faulty spots as described above (Japanese Patent Publication No. 07-076720, hereinafter referred to as "JP07-076720B", and U.S. Patent Application Publication No. 2001/0002450, hereinafter referred to as "US2001/0002450A1"). According to JP07-076720B, the diagnosing apparatus reads trouble data stored in a vehicle ECU and converts the trouble data into a trouble code. The diagnosing apparatus also stores in a memory cartridge fault detail data corresponding to the trouble code in a service manual, and displays an identification symbol (fault abbreviation, etc.) corresponding to the trouble code (Claim 1).

According to US2001/0002450A1, the worker performs a fault diagnosis while interacting with a computer (fault diagnosing apparatus (1)) (see Abstract). More specifically, the fault diagnosing apparatus (1) displays HTML data according to an inspection procedure based on a flowchart shown in FIG. 4 in order to indicate a fault diagnosis sequence in an interactive way (paragraph [0040]). Specific display contents are shown in FIGS. 5A and 5B (paragraph [0040]). According to US2001/0002450A1, furthermore, in the event of a fault diagnosis, vehicle data are automatically acquired from an ECU and displayed (Abstract, FIGS. 5A through 7, paragraph [0053]).

SUMMARY OF INVENTION

According to JP07-076720B, although the worker can grasp a faulty event from a trouble code and an identification symbol that are displayed, the worker needs to identify a specific faulty spot by successively checking relevant spots according to given procedures while referring to a service manual. The process is inconvenient because it is tedious and time consuming for the worker to refer to the diagnostic procedures and normal value data in the service manual.

According to US2001/0002450A1, the worker merely is shown individual specific work content according to fault diagnosis procedures (see FIGS. 5A and 5B). Although the process allows even an inexperienced worker to easily carry out a fault diagnosis, the worker is unable to sufficiently grasp where a specific displayed work process for the occurring faulty event is located within the entire required fault diagnosis procedure, as well as the purpose and meaning of the specific work process. As a result, there is room for improvement as to the promotion of adequate decisions to be made by the worker, as well as sharpening the skills of the worker.

Further, according to US2001/0002450A1, vehicle data designated by a parameter file are automatically acquired from an ECU. However, US2001/0002450A1 does not mention which process requires the vehicle data or how the vehicle data is used for the next decision. From this standpoint also, there is room for improvement as to the promotion of adequate decisions to be made by the worker, as well as sharpening the skills of the worker.

The present invention has been made in view of the above problems. It is an object of the present invention to provide a fault diagnosing method and a fault diagnosing apparatus, which allow even an inexperienced worker to easily carry out a fault diagnosis, and which are effective to promote adequate decisions to be made by the worker and to sharpen the skill of the worker.

According to the present invention, there is provided a fault diagnosing method carried out in association with an electronic control unit mounted on a vehicle, for reading self-diagnosis result data stored in the electronic control unit into an external diagnosing apparatus and diagnosing the vehicle for a fault, comprising a diagnostic trouble code reading step of reading a diagnostic trouble code for identifying a faulty event from the electronic control unit into the external diagnosing apparatus, and a work guidance step of displaying a work guidance screen for guiding work depending on the read diagnostic trouble code. The work guidance screen has an overall work display area including an overall work flowchart which is made up of a plurality of work items for identifying a faulty spot where the faulty event corresponding to the diagnostic trouble code has occurred, with a selected one of the work items being displayed in highlighted form, and a specific work display area representing specific work content concerning the work item that is displayed in highlighted form.

According to the present invention, both the position of a selected work item in the overall work flowchart, and specific work content concerning the selected work item are displayed on one screen (work guidance screen). Therefore, the operator can adequately proceed with diagnostic work, including required operations and measurements displayed on the screen, while confirming the specific work content as placed within the overall work flow, when necessary. The operator is also able to grasp the entire work procedure and perform the specific displayed work items while understanding why the specific work items are performed. Consequently, even if the operator is inexperienced, the operator can acquire a better understanding of the corresponding fault diagnosis, and the skill of the operator can be improved based on an accumulation of work experience.

The work guidance step may comprise displaying alternatives for confirming results of the work items on the work guidance screen, and if there is a next work item depending on a selected one of the alternatives, switching a highlighted display from the present work item to the next work item in the overall work display area, and displaying specific work content corresponding to the next work item in the specific work display area.

Depending on the selection of the result of a work item, therefore, a next work item and specific work content corresponding to the next work item are displayed for the operator to easily grasp the next work item and the specific work content in relation thereto. In particular, even if the present work item and the next work item are displayed in spaced-apart positions within the overall work flowchart (e.g., the present work item and the next work item are displayed in spaced-apart positions within the overall work flowchart due to the fact that there is a work item that corresponds to the selected result and a work item that does not correspond to the selected result), the operator can easily grasp the next work item and the specific work content in relation thereto.

The work items may include a plurality of diagnostic work items, and a plurality of repairing work items corresponding to the diagnostic work items. The work guidance step may comprise displaying the diagnostic work items and the repairing work items in the overall work display area, and displaying alternatives for confirming results of the diagnostic work items in the specific work display area, and if one of the repairing work items corresponds to a selected one of the alternatives, switching a highlighted display from a present one of the diagnostic work items to the one of the repairing work items in the overall work display area, and displaying specific repairing work content corresponding to the one of the repairing work items in the specific work display area.

The operator is thus able to visually recognize a transition from a present diagnostic work item to a next repairing work item, as well as to visually recognize specific repairing work content corresponding to the repairing work item. If the present diagnostic work item and the corresponding repairing work item are displayed simultaneously, then even after the highlighted display has been switched from the diagnostic work item to the repairing work item, the operator can visually recognize the diagnostic work item and the repairing work item simultaneously, and can subsequently easily confirm the relationship between the diagnostic work item and the repairing work item. Therefore, the operator can acquire a deeper understanding of the fault diagnosis.

The work guidance step may comprise displaying a verifying work item for verifying results of repairs concerning the repairing work items in addition to the diagnostic work items and the repairing work items in the overall work display area, and if a signal is entered for indicating that a repairing work of one of the repairing work items is finished, switching the highlighted display from a present one of the repairing work items to the verifying work item in the overall work display area, and displaying specific verifying work content corresponding to the verifying work item on the work guidance screen in the specific work display area, and reading the self-diagnosis result data stored in the electronic control unit into the external diagnosing apparatus, and displaying, in the external diagnosing apparatus, whether or not the diagnostic trouble code exists. Therefore, after the repairing work is finished, the diagnosing apparatus may instruct the operator to perform a specific verifying work. Thus, the specific verifying work can reliably be carried out.

According to the present invention, there is also provided a fault diagnosing method carried out in association with an electronic control unit mounted on a vehicle, for reading self-diagnosis result data stored in the electronic control unit into an external diagnosing apparatus and diagnosing the vehicle for a fault, comprising a diagnostic trouble code reading step of reading a diagnostic trouble code for identifying a faulty event from the electronic control unit into the external diagnosing apparatus, and a work guidance step of displaying a work guidance screen for guiding work depending on the read diagnostic trouble code. The work guidance screen has an overall work display area including an overall work flowchart, which is made up of a plurality of work items for identifying a faulty spot where the faulty event corresponding to the diagnostic trouble code has occurred, and a specific work display area representing specific work content concerning a selected one of the work items. The work guidance step further comprises reading vehicle data required for the specific work content from the electronic control unit into the external diagnosing apparatus, and displaying the vehicle data together with the specific work content in the specific work display area.

According to the present invention, both the position of a selected work item within the overall work flowchart, and specific work content concerning the selected work item are displayed on one screen (work guidance screen). Therefore, the operator can adequately proceed with diagnostic work, including required operations and measurements displayed on the screen, while confirming the specific work content as placed within the overall work flow, when necessary. The operator is also able to grasp the entire work procedure and perform the specific displayed work items while understanding why the specific work items are performed. Consequently, even if the operator is inexperienced, the operator can acquire a better understanding of the corresponding fault diagnoses, and the skill of the operator can be improved based on an accumulation of work experience.

According to the present invention, furthermore, since vehicle data required for the specific work content are acquired and displayed together with the specific work content, the burden on the operator is reduced. In addition, not only is the result of a judgment based on the vehicle data displayed, but the acquired vehicle data also are displayed. Consequently, the operator can proceed with the specific work items after a judgment is made concerning the actual vehicle data. It is thus possible to allow the operator to acquire a deeper understanding of the fault diagnosis, and for the skill of the operator to be sharpened.

The work guidance step may comprise displaying the vehicle data together with judging criteria with respect to the vehicle data. Therefore, the operator can proceed with a specific work item after making a judgment in relation to the actual vehicle data and the judging criteria. It is thus possible to allow the operator to acquire a deeper understanding of the fault diagnosis, and for the skill of the operator to be sharpened.

According to the present invention, there also is provided a fault diagnosing apparatus connected to an electronic control unit mounted on a vehicle, for reading self-diagnosis result data stored in the electronic control unit and diagnosing the vehicle for a fault, comprising a reader for reading a diagnostic trouble code for identifying a faulty event from the electronic control unit, and a display controller for displaying on a display unit a work guidance screen for guiding work depending on the read diagnostic trouble code. The display controller displays on the work guidance screen an overall work display area including an overall work flowchart, which is made up of a plurality of work items for identifying a faulty spot where the faulty event corresponding to the diagnostic trouble code has occurred, with a selected one of the work items being displayed in highlighted form, and a specific work display area representing specific work content concerning the work item that is displayed in highlighted form.

The display controller may display alternatives for confirming results of the work items on the work guidance screen, and if there is a next work item depending on a selected one of the alternatives, the display controller may switch a highlighted display from the present work item to the next work item in the overall work display area, and display specific work content corresponding to the next work item in the specific work display area.

The work items may include a plurality of diagnostic work items, and a plurality of repairing work items corresponding to the diagnostic work items. The display controller may display the diagnostic work items and the repairing work items in the overall work display area, and display alternatives for confirming results of the diagnostic work items in the specific work display area. If one of the repairing work items corresponds to a selected one of the alternatives, the display controller may switch a highlighted display from a present one of the diagnostic work items to the one of the repairing work items in the overall work display area, and display specific repairing work content corresponding to the one of the repairing work items in the specific work display area.

The display controller may display a verifying work item for verifying results of repairs concerning the repairing work items in addition to the diagnostic work items and the repairing work items in the overall work display area. If a signal is entered for indicating that a repairing work of one of the repairing work items is finished, the display controller may switch the highlighted display from a present one of the repairing work items to the verifying work item in the overall work display area, and display specific verifying work content corresponding to the verifying work item on the work guidance screen in the specific work display area. The display controller may read the self-diagnosis result data stored in the electronic control unit, and display whether or not the diagnostic trouble code exists.

According to the present invention, there also is provided a fault diagnosing apparatus connected to an electronic control unit mounted on a vehicle, for reading self-diagnosis result data stored in the electronic control unit and diagnosing the vehicle for a fault, comprising a reader for reading a diagnostic trouble code for identifying a faulty event from the electronic control unit, and a display controller for displaying on a display unit a work guidance screen for guiding work depending on the read diagnostic trouble code. The display controller displays on the work guidance screen an overall work display area including an overall work flowchart, which is made up of a plurality of work items for identifying a faulty spot where the faulty event corresponding to the diagnostic trouble code has occurred, and a specific work display area representing specific work content concerning a selected one of the work items. The display controller reads vehicle data required for the specific work content from the electronic control unit, and displays the vehicle data together with the specific work content in the specific work display area.

The display controller may display the vehicle data together with judging criteria with respect to the vehicle data.

BRIEF DESCRIPTION OF DRAWINGS

FIG. 5 is a diagram showing a first example of displays in a specific work display area of the work guidance screen;

FIG. 6 is a diagram showing a second example of displays in the specific work display area;

FIG. 7 is a diagram showing a third example of displays in the specific work display area;

FIG. 8 is a diagram showing a fourth example of displays in the specific work display area;

FIG. 9 is a diagram showing a sixth example of displays in the specific work display area;

FIG. 14 is a diagram showing an example of a pop-up screen.

DESCRIPTION OF EMBODIMENTS

A. Embodiment

Figure 1:
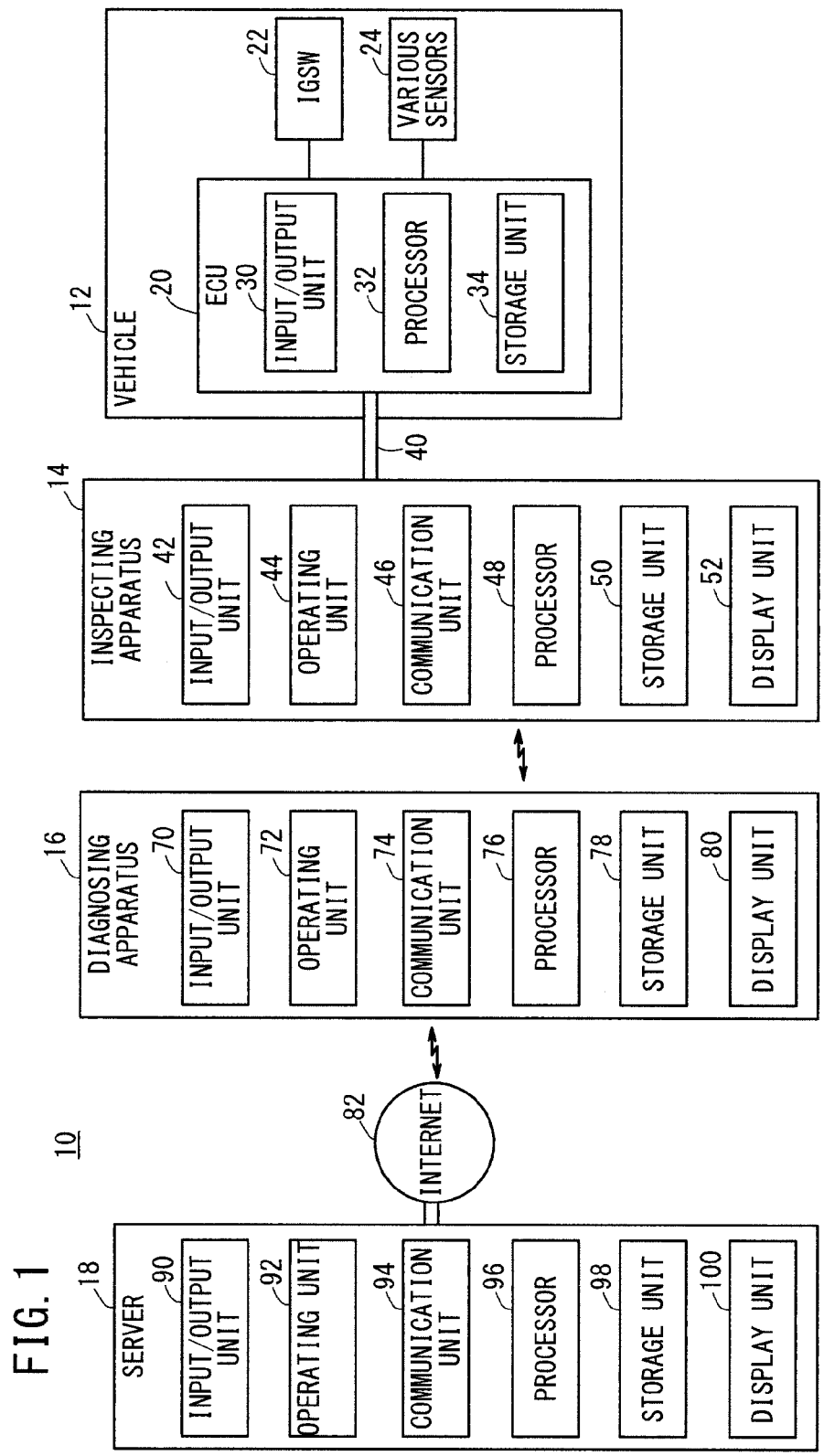
FIG. 1 is a block diagram showing a general arrangement of a fault diagnosing system incorporating a fault diagnosing apparatus according to an embodiment of the present invention.

1. Arrangement (1) Overall Arrangement:

FIG. 1 is a block diagram showing a general arrangement of a fault diagnosing system 10 (hereinafter also referred to as a "system 10") incorporating a fault diagnosing apparatus 16 (hereinafter referred to as a "diagnosing apparatus 16") according to an embodiment of the present invention. The system 10 includes a vehicle 12 as a target object to be diagnosed, an inspecting apparatus 14 serving as an interface for reading out from the vehicle 12 self-diagnosed data concerning the vehicle 12, a diagnosing apparatus 16 for diagnosing the vehicle 12 for a fault, and a server 18. In FIG. 1, the vehicle 12, the inspecting apparatus 14, and the diagnosing apparatus 16 are shown individually each consisting of one device. However, the vehicle 12, the inspecting apparatus 14, and the diagnosing apparatus 16 may each be made up from a plurality of devices.

(2) Vehicle 12:

The vehicle 12 has an electronic control unit 20 (hereinafter referred to as an "ECU 20"), an ignition switch 22 (hereinafter referred to as an "IGSW 22") for turning on and off the ECU 20, and various sensors 24. The ECU 20 controls an engine, a transmission, a brake, etc., of the vehicle 12, and has an input/output unit 30, a processor 32, and a storage unit 34, as shown in FIG. 1.

(3) Inspecting Apparatus 14:

The inspecting apparatus 14 is used to carry out inspection of various components of the vehicle 12 as a communication interface, which is connected to the ECU 20 of the vehicle 12, and for reading data from the vehicle 12.

As shown in FIG. 1, the inspecting apparatus 14 includes a cable 40 for connection to the vehicle 12, an input/output unit 42 connected to the cable 40, an operating unit 44, a communication unit 46 for wirelessly communicating with the diagnosing apparatus 16, a processor 48 for controlling various components of the inspecting apparatus 14, a storage unit 50 for storing various programs such as a control program run by the processor 48 together with various data, and a display unit 52. The cable 40 may be replaced with a wireless communication function. The operating unit 44 includes operating buttons, etc., which are manually operable in order to send pseudo signals to the ECU 20 or to the various sensors 24 of the vehicle 12 if necessary. The display unit 52 displays various data on a monitor, such as data read from the ECU 20.

(4) Diagnosing Apparatus 16:

The diagnosing apparatus 16 includes an input/output unit 70 for inputting and outputting signals, an operating unit 72 such as a keyboard, a mouse, a touchpad, etc., not shown, a communication unit 74 for communicating through the Internet 82 with the inspecting apparatus 14 and the server 18, a processor 76 for controlling various components of the diagnosing apparatus 16 and for performing a fault diagnosis on the vehicle 12, a storage unit 78 for storing various programs such as a fault diagnosis program and a control program run by the processor 76, as well as for storing various data, and a display unit 80 for displaying various data. As hardware thereof, the diagnosing apparatus 16 may be in the form of a commercially available laptop personal computer.

For performing a fault diagnosis on the vehicle 12 with the diagnosing apparatus 16, the operator connects the cable 40 of the inspecting apparatus 14 to a non-illustrated connector (data link connector) on an instrument panel (not shown) of the vehicle 12, in order to make the ECU 20 capable of communicating with the diagnosing apparatus 16 and the server 18. Thereafter, in response to an operation performed by the operator on the operating unit 72 of the diagnosing apparatus 16, the diagnosing apparatus 16 carries out a fault diagnosis on the vehicle 12. Details of the fault diagnosis performed on the vehicle 12, which is carried out by the diagnosing apparatus 16, will be described later.

(5) Server 18:

The server 18 includes an input/output unit 90 for inputting and outputting signals, an operating unit 92 such as a keyboard, etc., not shown, a communication unit for communicating with the diagnosing apparatus 16 through a communication link such as the Internet 82 or the like, a processor 96 for controlling various components of the server 18, a storage unit 98 for storing various programs such as a control program run by the processor 96 as well as for storing various data, and a display unit 100 for displaying various data.

2. Fault Diagnosis (1) Outline of Fault Diagnosis (Process by Operator):

An outline of a fault analysis (a process carried out by the operator) according to the present invention will be described below. First, the operator undertakes preparations for the fault analysis in advance. More specifically, the operator connects the cable 40 of the inspecting apparatus 14 to the data link connector (not shown) of the vehicle 12, and turns on respective power supplies of the ECU 20, the inspecting apparatus 14, the diagnosing apparatus 16, and the server 18. The diagnosing apparatus 16 activates diagnostic software. At this time, the ECU 20, the inspecting apparatus 14, the diagnosing apparatus 16, and the server 18 are capable of communicating with each other. The diagnostic software run by the diagnosing apparatus 16 is not limited to a program that is stored in the storage unit 78, but may be a program downloaded from the server 18, or a program provided by an ASP (Application Service Provider), rather than being downloaded from the server 18.

The operator also reads diagnostic trouble codes (DTC), which are stored in the storage unit 34 of the ECU 20, via the inspecting apparatus 14, and displays the read diagnostic trouble codes on the display unit 80 of the diagnosing apparatus 16. The operator then selects one of the diagnostic trouble codes displayed on the display unit 80, which is to be diagnosed, and enters the selected diagnostic trouble code using an operation screen of the diagnostic software (if plural diagnostic trouble codes are displayed, a diagnostic process is carried out for each of the diagnostic trouble codes). At this time, the display unit 80 of the diagnosing apparatus 16 displays a screen, i.e., a work guidance screen 110 (see FIGS. 3 through 9), for facilitating guidance of the diagnostic process, which corresponds to a faulty event (including a fault route, a fault system, etc.) identified by the diagnostic trouble code.

Thereafter, while observing the work guidance screen 110, the operator performs the fault diagnosis, i.e., identifies a faulty spot, repairs the faulty spot by replacing a component or components, and then confirms that the repaired spot is functioning normally.

Figure 2:
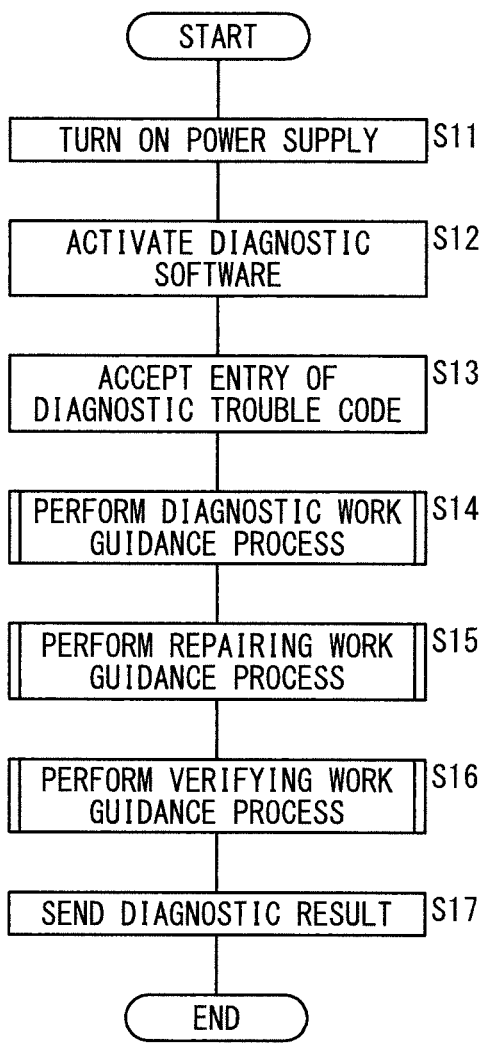
FIG. 2 is a flowchart of a general processing sequence of the fault diagnosing apparatus.

(2) Processing Sequence of Diagnosing Apparatus 16:

FIG. 2 is a flowchart of a general processing sequence of the diagnosing apparatus 16. In step S11, the operator turns on a non-illustrated power supply switch to energize the diagnosing apparatus 16. In step S12, the diagnosing apparatus 16 activates diagnostic software in response to operations made by the operator on the operating unit 72. Thereafter, the display unit 80 displays an input screen (not shown) for entering diagnostic trouble codes.

In step S13, the diagnosing apparatus 16 accepts entry of a diagnostic trouble code on the input screen.

In step S14, the diagnosing apparatus 16 performs a diagnostic work guidance process for identifying a faulty spot. According to the diagnostic work guidance process, the diagnosing apparatus 16 displays on the display unit 80 a work guidance screen 110, in which all of the work items required for the operator to identify the faulty spot are shown together with work content for each selected work item. Based on the displayed work content, the operator is able to identify the faulty spot.

In step S15, the diagnosing apparatus 16 carries out a repairing work guidance process for guiding the operator in relation to a specific repairing work process. In step S16, the diagnosing apparatus 16 carries out a verifying work guidance process for guiding the operator in relation to a process for verifying normal operation. In step S17, in response to the operator operating the operating unit 72, the diagnosing apparatus 16 sends the present diagnostic result to the server 18. The server 18, which receives the diagnostic result, stores the diagnostic result in a database of the storage unit 98.

The stored diagnostic result may include a procedural sequence, which indicates a diagnostic procedure or work item with respect to diagnosis of the fault that has occurred. In addition to sending the diagnostic result to the server 18 for use thereby, the diagnosing apparatus 16 may store the procedural sequence concerning the diagnostic result in the storage unit 78, so that the procedural sequence can be used effectively as part of a diagnostic history, which may be checked by an expert in the event that an expert is required to handle faults that are difficult to repair.

Prior to describing details of the diagnostic work guidance process, the repairing work guidance process, and the verifying work guidance process, the work guidance screen 110 will first be described below.

Figure 3:
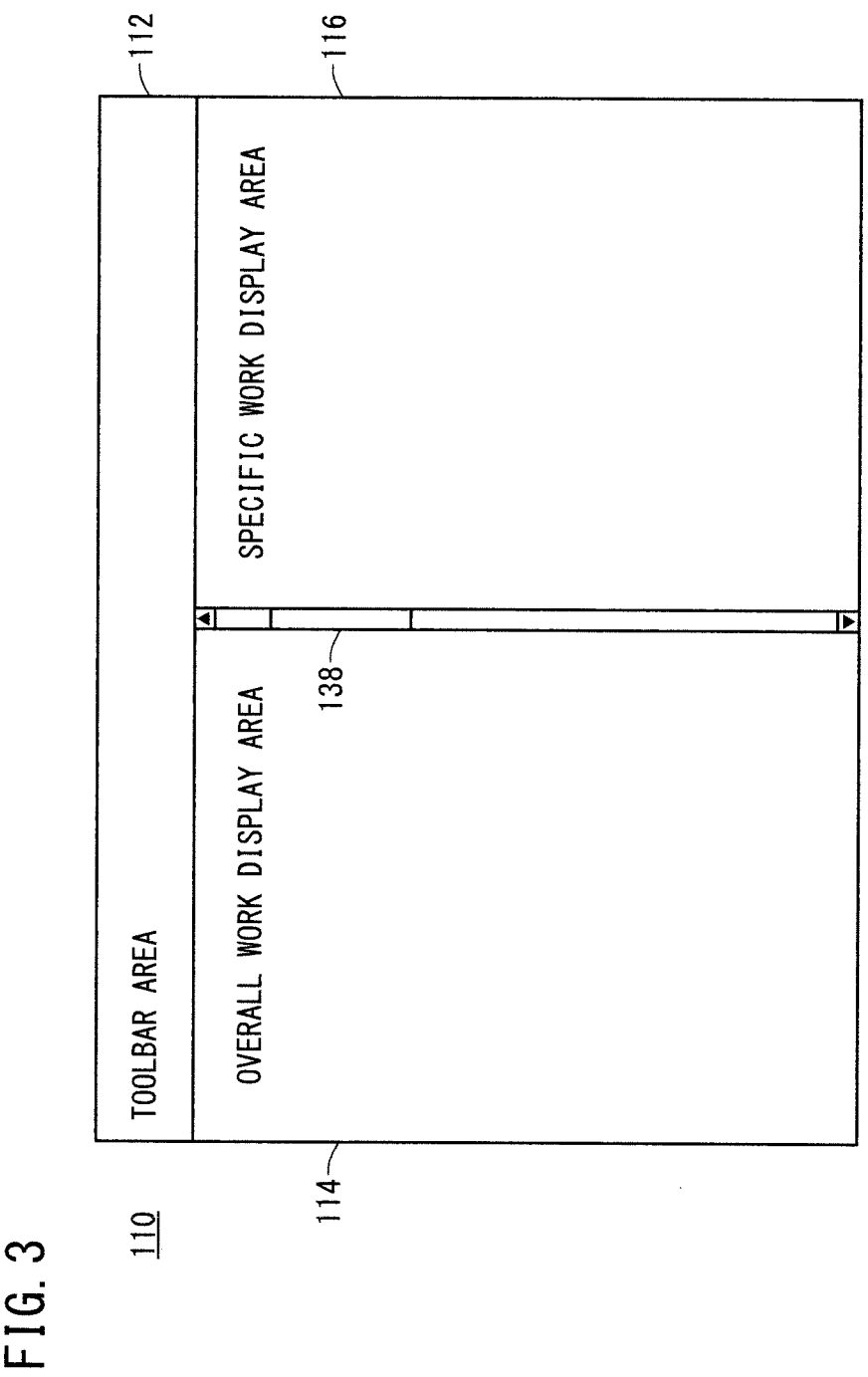
FIG. 3 is a diagram showing positions of different areas of a work guidance screen, which is displayed in a diagnostic work guidance process.

FIG. 3 is a diagram showing positions of different areas of the work guidance screen 110, which are displayed during the diagnostic work guidance process. As shown in FIG. 3, the work guidance screen 110 is mainly made up of a toolbar area 112, an overall work display area 114, and a specific work display area 116.

The toolbar area 112 is an area that displays toolbars, not shown, including icons representing features such as "SAVE", "PRINT", etc.

Figure 4:
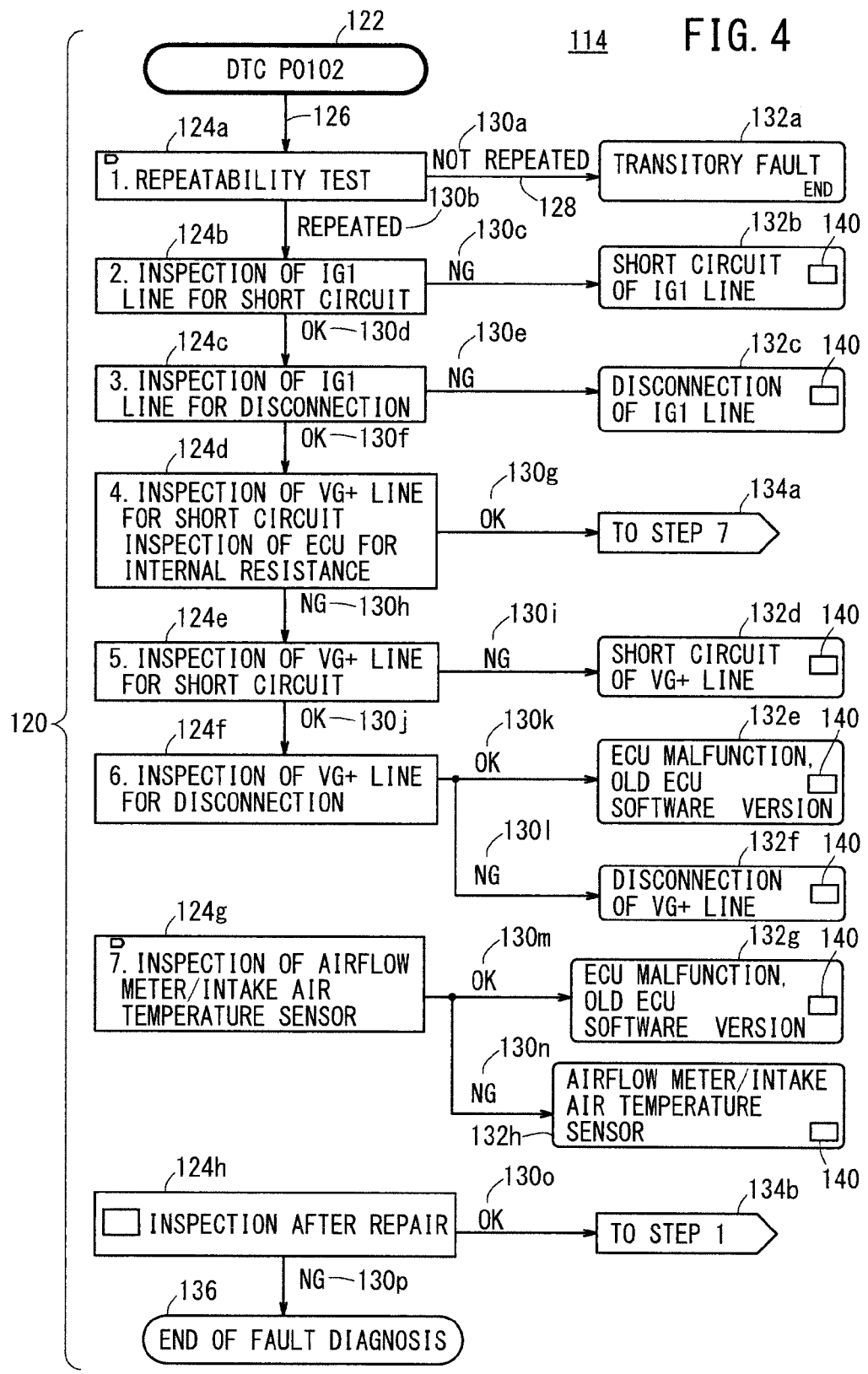
FIG. 4 is a diagram showing an example of displays in an overall work display area of the work guidance screen.

FIG. 4 is a diagram showing an example of displays that are shown in the overall work display area 114. The overall work display area 114 is an area in which an overall work flowchart 120 is displayed, depending on the diagnostic trouble code that was entered in step S13 of FIG. 2.

As shown in FIG. 4, the overall work flowchart 120 has a start box 122, first through eighth work title boxes 124a through 124h (hereinafter collectively referred to as "work title boxes 124"), a plurality of vertical arrows 126, a plurality of horizontal arrows 128, first through sixteenth inspection result boxes 130a through 130p (hereinafter collectively referred to as "inspection result boxes 130"), first through eighth diagnostic result boxes 132a through 132h (hereinafter collectively referred to as "diagnostic result boxes 132"), first and second skip boxes 134a, 134b (hereinafter collectively referred to as "skip boxes 134"), an end box 136, and a scroll bar 138 (FIG. 3).

The start box 122 is a field for displaying a diagnostic trouble code or symptom. According to the present embodiment, the start box 122 is shown as displaying a diagnostic trouble code (DTC) "P0102" (indicating that the airflow sensor circuit voltage is low).

Each of the work title boxes 124 is a field for displaying a work title (work item). Work titles (work items) include diagnostic work items and verifying work items. More specifically, the diagnostic work items may be the items described in the first through seventh work title boxes 124a through 124g. The verifying work item may be the item described in the eighth work title box 124h.

The vertical arrows 126 and the horizontal arrows 128 point to work title boxes 124 and diagnostic result boxes 132, which are proceeded to next.

Each of the inspection result boxes 130 is a field for displaying an inspection result ("OK" (normal) or "NG" (abnormal)). Since the background and the frames thereof are transparent, only the letters within the inspection result boxes 130 are shown in FIG. 4.

Each of the diagnostic result boxes 132 is a field for displaying a repairing work item. According to the present embodiment, the diagnostic result boxes 132 show repair content (objects to be repaired) by indicating fault content (transient faults, an IG1 line short circuit, etc.) and faulty regions, or faulty spots (airflow meter/intake air temperature sensor, etc.). With respect to completed work items, the diagnostic result boxes 132 (FIG. 4) are combined with respective operation buttons 140 for proceeding to an after-repair inspection process (described later) when a repairing process has been completed as a result of a diagnosis.

Each of the skip boxes 134 is a field for indicating a skip from a certain work title box 124 to another work title box 124. For example, the first skip box 134a represents a skip from the fourth work title box 124d to the seventh work title box 124g. The end box 136 is a field for indicating completion of the overall diagnostic process.

The scroll bar 138 (FIG. 3) is a bar for scrolling through the displays in the overall work display area 114. More specifically, if the overall work flowchart 120 cannot be displayed in the overall work display area 114 shown in FIG. 4, the operator can move the scroll bar 138 in order to vertically shift the display provided in the overall work display area 114, so as to enable viewing of the overall work flowchart 120 in its entirety.

In the overall work flowchart 120, the first through eighth work title boxes 124a through 124h in principle are arranged in the order of the diagnostic (inspecting) or verifying work items to be performed. If, depending on the result of a diagnosis, there are multiple combinations of diagnostic work items (diagnostic systems) to be performed, then a certain diagnostic system is disposed immediately below a certain work title box 124, whereas another diagnostic system is disposed remotely from the work title box 124 with the use of a skip box 134. As a consequence, the work title boxes 124 are displayed in a vertical array. If displayed in this manner, the work title boxes 124, which are displayed in a vertical array, are combined with the scroll bar 138, so as to make the displayed form of the overall work display area 114 compact and easy to view.

A work title box 124 to be handled, i.e., a work item to be taken care of, is highlighted in the display by having the frame thereof thickened. For example, if the first work title box 124a ("1. REPEATABILITY TEST") is to be handled, then the first work title box 124a is highlighted in the display by having the frame thereof thickened. Alternatively, if the overall work guidance screen 110 is displayed in color, then a work title box 124 to be handled may be highlighted in the display by changing the background color of the work title box 124, e.g., from blue to orange.

FIGS. 5 through 9 show first through fifth examples, respectively, of the specific work display area 116. The specific work display area 116 is an area for displaying a specific work item (specific diagnostic work, specific repairing work, or specific verifying work) depending on a work title box 124 or a diagnostic result box 132 currently being handled.

More specifically, the specific work display area 116 shown in FIG. 5 has a descriptive statement display field 142 for displaying specific work content, and an illustration display field 144 for displaying content or objects to be measured by way of a table or an illustration. As shown in FIGS. 6, 8 and 9, the specific work display areas 116 have, in addition to a descriptive statement display field 142 and an illustration display field 144, a result input field 146 by which the operator judges, selects, and enters the result of work that the operator has performed based on the content displayed in the illustration display field 144. As shown in FIG. 7, the specific work display area 116 has a descriptive statement display field 142 and a result input field 146.

The descriptive statement display field 142 is a field for displaying a descriptive statement, which gives a detailed description of the content of a specific work item. When the start box 122 is displayed in highlighted form (i.e., is selected), more specifically, as shown in FIG. 4, "DTC P0102" is selected and displayed in the overall work display area 114 in a left-hand section of the work guidance screen 110. Also, the descriptive statement, which is displayed in the specific work display area 116 shown in FIG. 5 in a right-hand section of the work guidance screen 110, includes a description of the diagnostic trouble code in the start box 122, or more specifically, the statements "DTC P0102: VOLTAGE OF AIRFLOW SENSOR CIRCUIT IS LOW" and "NOTES: BEFORE STARTING FAULT DIAGNOSIS, RECORD ALL FROZEN DATA AND ONBOARD SNAPSHOT DATA AND CONFIRM GENERAL INFORMATION ABOUT FAULT DIAGNOSIS" are displayed, thus indicating to the operator the type of faulty event and precautions to be followed before the diagnostic process is started.

When a work title box 124 that displays a work item is displayed in highlighted form (i.e., is selected) in the overall work display area 114 in the left-hand section of the work guidance screen 110, the descriptive statements displayed in the specific work display areas 116, as shown in FIGS. 6 through 9 in the right-hand section of the work guidance screen 110, include the work title (work item) in the work title box 124 or a specific description thereof (the purpose of the work, etc.), together with a description of a detailed work item for specifically realizing the content indicated by the description of the work title. For example, if a work item "2. INSPECTION OF IG1 LINE FOR SHORT CIRCUIT" (second work title box 124b) is selected and displayed in highlighted form, then as shown in FIG. 7, the displayed work content includes the descriptive statements "2. INSPECT IG1 LINE FOR SHORT CIRCUIT BETWEEN AIRFLOW SENSOR/INTAKE AIR TEMPERATURE SENSOR AND NO. 12IMA (10A) FUSE", "−1. INSPECT FOLLOWING FUSE", "FUSE NO. 12IMA", "LOCATION: FUSE/RELAY BOX BELOW DASHBOARD".

As described above, the illustration display field 144 displays content and objects to be measured. According to the present embodiment, the illustration display field 144, which appears in the specific work display area 116 shown in FIG. 6, displays criteria for judging a fault at a time that the operator conducts the test described in the descriptive statement display field 142 shown in FIG. 6. The illustration display field 144 also displays the result of an actually conducted test, which is read as vehicle data. More specifically, the illustration display field 144 displays a description of a threshold value ("0.1 OR SMALLER", etc., in FIG. 6) for judging a fault, and a measured value ("0", etc., in FIG. 6) of vehicle data (detected data from the airflow sensor). The displayed measured value is acquired by the diagnosing apparatus 16 automatically from the ECU 20 via the inspecting apparatus 14.

The descriptive statement display field 142 or the illustration display field 144 may include an input button for controlling the ECU 20 in order to acquire vehicle data. For example, as shown in FIG. 9, the operator may press (click on) an input button 156 to reset the ECU 20.

The result input field 146 includes a question statement 150 in relation to the result of the test that is described in the descriptive statement display field 142, result alternatives 152a, 152b (hereinafter collectively referred to as "alternatives 152"), and descriptive statements 154a, 154b (hereinafter collectively referred to as "descriptive statements 154") concerning the alternatives 152. The operator can select one of the alternatives 152 at a time by operating the operating unit 72, e.g., by bringing a cursor to one of the alternatives 152 using the mouse or the touchpad, and then clicking on the selected alternative.

The specific work display area 116 may include a scroll bar similar to the scroll bar 138 of the overall work display area 114, for scrolling displays in the specific work display area 116.

The specific work display area 116 may incorporate hyperlinks referring to terms, for example. When one of the terms is selected using the mouse or the touchpad, a description of the term may be sent from the corresponding hyperlink and displayed on a pop-up screen.

The diagnostic work guidance process, the repairing work guidance process, and the verifying work guidance process of steps S14 through S16 are carried out using the above-described work guidance screen 110.

Figure 10:
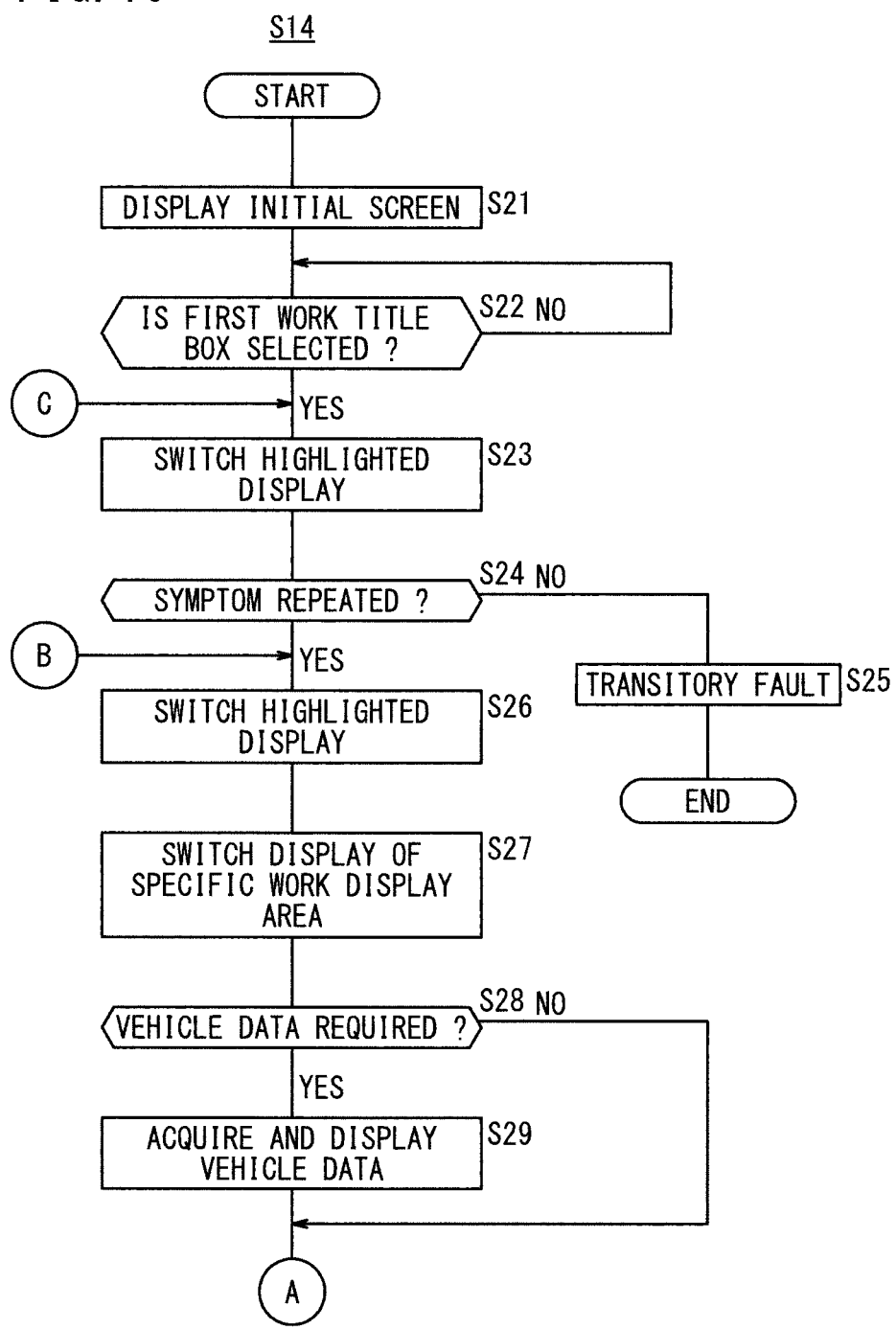
FIG. 10 is a first flowchart of the diagnostic work guidance process.
Figure 11:
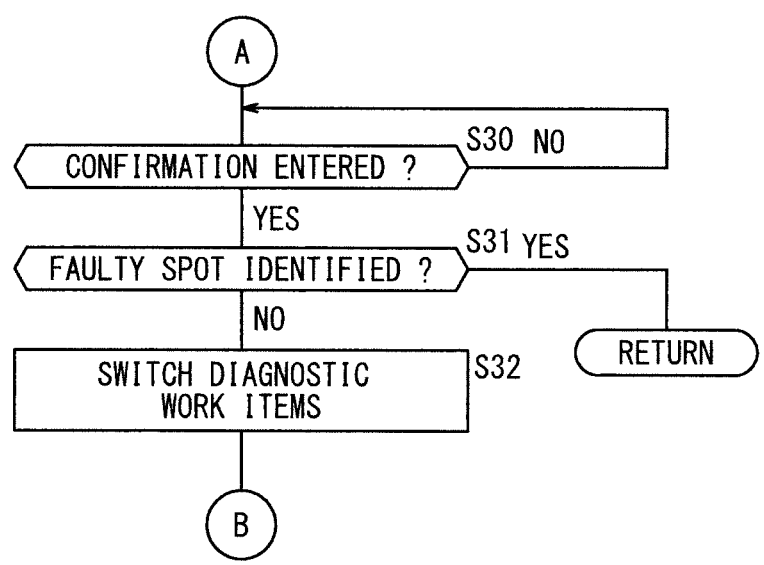
FIG. 11 is a second flowchart of the diagnostic work guidance process.
Figure 13:
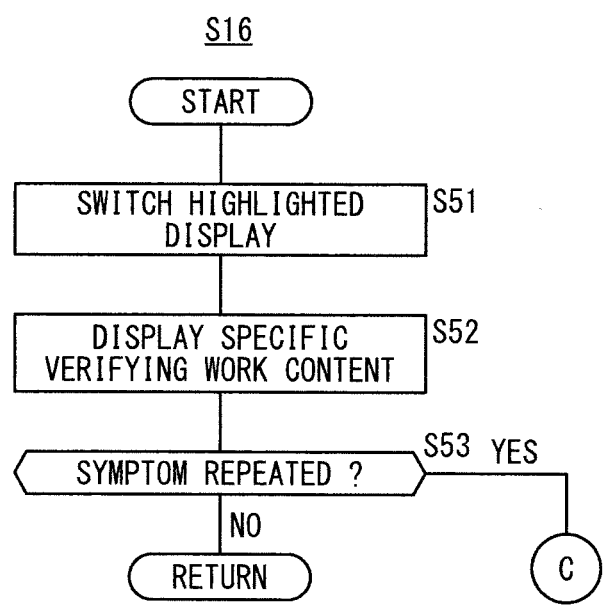
FIG. 13 is a flowchart of a verifying work guidance process.

FIGS. 10 and 11 show flowcharts (details of step S14 of FIG. 2) of the diagnostic work guidance process that is to be carried out by the diagnosing apparatus 16. FIG. 13 shows a flowchart (details of step S15 of FIG. 2) of the repairing work guidance process. FIG. 13 shows a flowchart (details of step S16 of FIG. 2) of the verifying work guidance process.

In step S21 shown in FIG. 10, the diagnosing apparatus 16 displays an initial screen of the work guidance screen 110 on the display unit 80. The initial screen includes the overall work display area 114 (see FIG. 4) and the specific work display area 116 (see FIG. 5) in left and right juxtaposed positions. The overall work display area 114 displays the start box 122 in highlighted form. The specific work display area 116 displays the descriptive statement display field 142 and the illustration display field 144, which display descriptive statements of diagnostic trouble codes, etc.

In step S22, the diagnosing apparatus 16 judges whether or not the first work title box 124a has been selected. The operator can select the first work title box 124a by bringing the cursor to one of the alternatives 152 with the mouse or the touchpad, and then clicking on the alternative, for example.

If the first work title box 124a is not selected (step S22: NO), then the diagnosing apparatus 16 repeats step S22. If the first work title box 124a is selected (step S22: YES), then the diagnosing apparatus 16 switches the highlighted display from the start box 122 to the first work title box 124a. At the same time, the diagnosing apparatus 16 switches from the specific work display area 116 shown in FIG. 5 to the specific work display area 116 shown in FIG. 6.

The operator turns on the IGSW 22 and waits for 2 seconds according to the work content "TURN ON (II) IGNITION SWITCH AND WAIT FOR 2 SECONDS", which is provided in the descriptive statement display field 142 of the specific work display area 116, and confirms the fault judging threshold value together with the value of the present state displayed in the illustration display field 144. The value of the present state is represented by measured data read from the ECU 20 after the operator has turned on the IGSW 22 and has waited for 2 seconds, according to the instruction "CONFIRM FOLLOWING PARAMETERS" described in the descriptive statement display field 142.

Since the diagnosing apparatus 16 communicates at all times with the ECU 20 while the ECU is in operation, the diagnosing apparatus 16 is made ready to read data when the operator selects the first work title box 124a. Therefore, the diagnosing apparatus 16 automatically reads the measured data from the ECU 20 after the operator has turned on the IGSW 22 and has waited for 2 seconds.

According to the confirmation, and as an answer to the question statement 150 displayed in the result input field 146, the operator selectively enters the alternative 152a (YES button) if the fault is repeated, or enters the alternative 152b (NO button) if the fault is not repeated. Stated otherwise, in step S24, the diagnosing apparatus 16 confirms whether or not the faulty symptom is repeated. More specifically, if the alternative 152a is selected, then the diagnosing apparatus 16 determines that the symptom is repeated, and if the alternative 152b is selected, then the diagnosing apparatus 16 determines that the symptom is not repeated. The operator can select and enter the alternative 152a or 152b by bringing the cursor to the alternative 152a or 152b with the mouse or the touchpad, and then clicking on the alternative.

As described above, the diagnosing apparatus 16 makes a final judgment based on the selection that the operator has made and entered. Even if the operator is inexperienced, the diagnosing apparatus 16 gives the operator effective guidance for making a decision by highlighting either the alternative 152a (YES button) or the alternative 152b (NO button)

depending on the fault judgment threshold value and the automatic judgment based on the measured data.

If the diagnosing apparatus 16 automatically makes a judgment alone, and then proceeds to a subsequent step (=automatic judgment), then it is difficult for the operator to recognize what is being judged, and thus the operator, who may be inexperienced, does not accumulate diagnostic work experience. For this reason, the diagnosing apparatus 16 does not proceed to the next step automatically, but allows the operator to select one of the alternatives after the operator has recognized the judgment based on the measured data (=semi-automatic). The diagnosing apparatus 16 is thus highly effective to provide inexperienced operators with educational guidance.

If the alternative 152a is selected (step S24: YES), then the diagnosing apparatus 16 switches the highlighted display from the first work title box 124a to the second work title box 124b in the overall work display area 114 (step S26), and switches from the specific work display area 116 shown in FIG. 6 to the specific work display area 116 shown in FIG. 7 (step S27).

If the alternative 152b is selected (step S24: NO), then the diagnosing apparatus 16 highlights the diagnostic result box 132a, and continues to display the content of the highlighted diagnostic result box 132a in the specific work display area 116, while waiting for the operator to end the diagnostic process (step S25).

Subsequent to the second work title box 124b, the diagnosing apparatus 16 continues to confirm whether or not a faulty symptom is repeated, in the same manner as described above. For example, if the second work title box 124b is displayed in highlighted form in the overall work display area 114 (step S26), then the diagnosing apparatus 16 displays content corresponding to the second work title box 124b in the specific work display area 116 (step S27). The content corresponding to the second work title box 124b in the specific work display area 116 includes a descriptive statement display field 142 and a result input field 146 (see FIG. 7), as described above. Then, the diagnosing apparatus 16 waits for the operator to enter a confirmation (step S30 of FIG. 11). If the specific work display area 116 displays vehicle data (step S28: YES), as shown in FIG. 7, then the diagnosing apparatus 16 acquires the vehicle data via the inspecting apparatus 14, and displays the acquired vehicle data in the specific work display area 116 (step S29).

According to the work content described in the descriptive statement display field 142 of the specific work display area 116 shown in FIG. 7, the operator checks if the fuse No. 12IMA in the fuse/relay box below the dashboard is normal or not, and then selects and enters one of the alternatives 152a, 152b in the result input field 146. If the fuse is normal, then the operator selects and enters the alternative 152a (YES button), and if the fuse is abnormal, then the operator selects and enters the alternative 152b (NO button) (S30).

If the fuse is normal and the operator selects and enters the alternative 152a, then no faulty spot is identified (step S31: NO). Thereafter, the diagnostic work items are switched (step S32), and the next third work title box 124c ("3. INSPECTION OF IG1 LINE FOR DISCONNECTION") is displayed in highlighted form (step S26). At the same time, as shown in FIG. 8, the specific work display area 116 displays content corresponding to the third work title box 124c (step S27). Thereafter, a similar process is carried out until a faulty spot is identified.

In the case of the diagnostic work item corresponding to the fourth work title box 124d, there is an instance in which no faulty spot is identified when either one of the alternatives 152 is selected. More specifically, if the result from a diagnostic work item corresponding to the fourth work title box 124d is "OK", then control proceeds to a diagnostic work item corresponding to the seventh work title box 124g, and if the result from a diagnostic work item corresponding to the fourth work title box 124d is "NG", then control proceeds to a diagnostic work item corresponding to the fifth work title box 124e. In either case, a faulty spot has not yet been identified.

Figure 12:
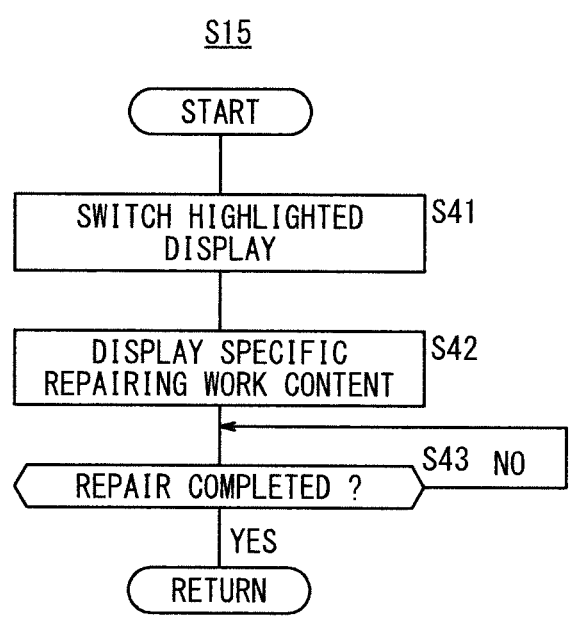
FIG. 12 is a flowchart of a repairing work guidance process.

If the fuse is abnormal and the alternative 152b is selected, then a faulty spot is identified (S31: YES). In this case, the diagnosing apparatus 16 switches the highlighted display from the second work title box 124b to the second diagnostic result box 132b (step S41 of FIG. 12), and the specific work display area 116 continuously displays the inspection work content described in the descriptive statement display field 142, as shown in FIG. 7, thereby allowing the operator to simultaneously confirm a history of the inspection work carried out in the repairing process. More specifically, the faulty spot (a short circuit of the IG1 line) and the description of a repairing process (specific repair work content) are displayed in juxtaposed positions for facilitating comparison therebetween (step S42). As described above, the second diagnostic result box 132b has an operation button 140 for proceeding to an inspection process, in order to confirm the result of the repairing process when the repairing process is completed.

The operator performs a repairing process (to replace the IG1 line) based on the above description, and selects the operation button 140 upon completion of the repairing process (step S43: YES). The operation button 140 can also be operated when the operator clicks on a highlighted display area 160 ("INSPECTION AFTER REPAIR"), which is provided in the descriptive statement of the repair work in the result input field 146. The letters of the display area 160 may be highlighted in a different color, or by underlining drawn beneath the letters, rather than being enclosed by broken lines as shown in FIG. 7.

If the operator selects either the operation button 140 or the highlighted display area 160 in the result input field 146, the diagnosing apparatus 16 switches the highlighted display from the second diagnostic result box 132b to the eighth work title box 124h with respect to a verifying work item in the overall work display area 114 (step S51 of FIG. 13). Further, as shown in FIG. 9, the specific work display area 116 displays specific verifying work content together with an input field for confirming whether or not a fault is repeated (step S52).

More specifically, the specific work display area 116 shown in FIG. 9 displays, in a descriptive statement display field 142 thereof, specific verifying work content items, including "INSPECTION AFTER REPAIR", "-1. LOCK (0) IGNITION SWITCH", "-2. RECONNECT ALL CONNECTORS", "-3. TURN ON (II) IGNITION SWITCH", "-4. RESET ECU WITH INSPECTING APPARATUS", "-5. PERFORM IDLE LEARNING WITH ECU", and "-6. CONFIRM VERIFIED OR EXISTING DTC WITH INSPECTING APPARATUS". The descriptive statement display field 142 also displays an input button 156 for resetting the ECU 20. For proceeding with a specific verifying work item, the operator can press the input button 156 in order to control the ECU 20, i.e., to reset the ECU 20.

The illustration display field 144 shown in FIG. 9 displays a description of the diagnostic trouble code (DTC) along with content representing a confirmation of the diagnostic trouble code. In addition, the result input field 146 shown in FIG. 9 displays a question statement 150 asking whether or not a diagnostic trouble code (DTC P0102) corresponding to the faulty event, the faulty spot of which is to be identified in the present work item, is displayed again, i.e., whether or not the diagnostic trouble code is output again from the ECU 20, result alternatives 152*a*, 152*b*, and descriptive statements 154*a*, 154*b* concerning subsequent work items depending on the respective alternatives 152*a*, 152*b*.

For example, if the diagnostic trouble code is displayed again and is confirmed by the operator, then the operator performs the work described in the descriptive statement 154*a*, i.e., "INSPECT CONNECTION BETWEEN AIRFLOW SENSOR/INTAKE AIR TEMPERATURE SENSOR AND ECU FOR FAILURE. IF ECU IS UPDATED, REPLACE IT WITH ECU CONFIRMED FOR OPERATION, AND REINSPECT ECU. IF ECU IS REPLACED, GO TO STEP 1." In order to go to step 1, the operator selects and enters the alternative 152 (YES button). The diagnosing apparatus 16 switches the highlighted display from the eighth work title box 124*h* to the first work title box 124*a* in the overall work display area 114, and switches from the specific work display area 116 shown in FIG. 9 to the specific work display area 116 shown in FIG. 6 (step S53 in FIG. 13: YES→step S23 in FIG. 10).

If the diagnostic trouble code is not displayed as confirmed by the operator, then the operator performs the work described in the descriptive statement 154*b*, i.e., "FAULT DIAGNOSIS IS COMPLETED. IF ANOTHER DTC WHOSE DISPLAY IS CONFIRMED OR WHICH IS BEING DISPLAYED IS INDICATED, GO TO FAULT DIAGNOSIS FOR DTC. IF ECU IS UPDATED, FAULT DIAGNOSIS IS COMPLETED. IF ECU IS REPLACED, REPLACE IT WITH ORIGINAL ECU." The operator then selects and enters the alternative 152*b* (NO button).

According to the present embodiment, a faulty spot is identified at all times except when a faulty symptom is not repeated (step S24: NO). If a faulty spot is not identified, then the present diagnostic process may be terminated at the time that a faulty spot is not identified.

3. Advantages of Present Embodiment

According to the present embodiment, as described above, one screen (work guidance screen 110) displays both the position of a work item selected in the overall work flowchart 120, together with specific work content (specific diagnostic work, specific repairing work, and specific verifying work) of the selected work item. Therefore, the operator can adequately proceed with diagnostic work including the required operations and measurements shown on the screen, while confirming the specific work content as placed within the overall work process, as necessary. The operator also is capable of grasping the entire work procedure, and can perform the displayed specific work items while understanding why the specific work items are performed. Consequently, even if the operator is inexperienced, the operator can acquire a better understanding of the corresponding fault diagnoses, thus enabling the skill of the operator to be improved based on an accumulation of work experience.

According to the present embodiment, the alternatives 152 for confirming results of work items are displayed on the work guidance screen 110. If, depending on a selected one of the alternatives 152, there is a next work item, the diagnosing apparatus 16 switches the highlighted display from the present work item (the work title boxes 124, the diagnostic result boxes 132) to the next work item (the work title boxes 124, the diagnostic result boxes 132), and the specific work display area 116 displays specific work content corresponding to the next work item (the work title boxes 124, the diagnostic result boxes 132).

Depending on the selection of the result of a work item, therefore, a next work item and specific work content corresponding to the next work item are displayed, thus enabling the operator to easily grasp the next work item and the specific work content thereof. In particular, even if the present work item (the work title boxes 124, the diagnostic result boxes 132) and the next work item (the work title boxes 124, the diagnostic result boxes 132) are displayed in spaced-apart positions in the overall work flowchart 120, for example, if the present work item (the work title boxes 124, the diagnostic result boxes 132) and the next work item (the work title boxes 124, the diagnostic result boxes 132) are displayed in spaced-apart positions in the overall work flowchart 120 because there is a work item (the work title boxes 124, the diagnostic result boxes 132) that does not correspond to the selected result, the operator can easily grasp the next work item (the work title boxes 124, the diagnostic result boxes 132) and the specific work content thereof.

According to the present embodiment, the alternatives 152 for confirming results of the work items are displayed in the specific work display area 116. Further, a plurality of repairing work items (diagnostic result boxes 132) in addition to a plurality of diagnostic work items (work title boxes 124) are displayed in the overall work display area 114. If a diagnostic result box 132 is displayed depending on the selected alternative 152, then the diagnosing apparatus 16 switches the highlighted display from the present work title box 124 to the diagnostic result box 132 in the overall work display area 114, and displays specific repairing work content corresponding to the diagnostic result box 132 in the specific work display area 116.

Thus, the operator is able to visually recognize the transition from a work title box 124, which represents a present diagnostic work item, to a diagnostic result box 132, which represents a next repairing work item, while also visually recognizing specific repairing work content corresponding to the diagnostic result box 132. If the present work title box 124 and the next diagnostic result box 132 are displayed simultaneously, then even after the highlighted display has switched from the work title box 124 to the diagnostic result box 132, the operator can visually recognize the work title box 124 and the diagnostic result box 132 at the same time, and subsequently can easily confirm the relationship between the work title box 124 and the diagnostic result box 132. Therefore, the operator can acquire a deeper understanding of the fault diagnosis.

According to the present embodiment, if the overall work display area 114 displays the eighth work title box 124*h* concerning a repairing and verifying work item, and a signal indicating that a repairing work item corresponding to the diagnostic result box 132 is entered from the outside, then the diagnosing apparatus 16 switches the highlighted display from the present diagnostic result box 132 to the eighth work title box 124*h*, displays specific verifying work content corresponding to the eighth work title box 124*h* on the work guidance screen 110 in the specific work display area 116, reads self-diagnosis result data from the ECU 20, and displays whether or not a diagnostic trouble exists.

Therefore, after a repairing work is completed, the diagnosing apparatus 16 instructs the operator to perform a specific verifying work process. Thus, the specific verifying work can reliably be carried out.

According to the present embodiment, since vehicle data required for a specific work item are automatically acquired and displayed together with a display concerning the specific work item (see FIG. 6), the burden on the operator is reduced. In addition, not only is the result of a judgment based on the vehicle data displayed, but in addition, the acquired vehicle data are displayed. Consequently, the operator can proceed to carry out the specific work item after making a judgment concerning the actual vehicle data. It is thus possible to allow the operator to acquire a deeper understanding of the fault diagnosis, as well as for the skill of the operator to be sharpened.

According to the present invention, vehicle data are displayed together with corresponding judging criteria (see FIG. 6). Therefore, the operator can proceed with a specific work item after making a judgment concerning the actual vehicle data and the judging criteria. Thus, the present invention allows the operator to acquire a deeper understanding of the fault diagnosis and for the skill of the operator to be sharpened.

B. Modifications

The present invention is not limited to the above embodiment, but various arrangements may be adopted based on the above-described disclosure. For example, the present invention may adopt the following alternative arrangements.

In the above embodiment, the diagnosing apparatus communicates with the ECU 20 via the inspecting apparatus 14. However, the diagnosing apparatus 16 may communicate directly with the ECU 20 via a wireless or wired link. The diagnosing apparatus 16 and the inspecting apparatus 14 may be integrally combined with each other. For example, the diagnosing apparatus 16 may be in the form of a laptop personal computer, and functions of the inspecting apparatus 14 may be incorporated in the laptop personal computer.

In the above embodiment, the diagnosing apparatus 16 is used in connection with the vehicle 12. However, the diagnosing apparatus 16 may be used in connection with other apparatus (e.g., mobile bodies such as ships, aircrafts, etc.).

In the above embodiment (FIG. 3), the overall work display area 114 and the specific work display area 116 are displayed in one display frame (window). However, the overall work display area 114 and the specific work display area 116 may be displayed respectively in separate display frames.

In the above embodiment (FIGS. 4 through 9), a faulty symptom indicative of the fact that the voltage of the airflow sensor is low has been described. However, the present invention is also applicable to various other faulty symptoms, insofar as diagnostic trouble codes for such faulty symptoms remain in the ECU 20.

In the above embodiment, the work title boxes 124, the alternatives 152, etc., are selected using the mouse or touch-pad of the operating unit 72. However, such items may be selected using a different operating device (input device) such as a keyboard or the like.

In the above embodiment, the work title boxes 124 include therein the first through seventh work title boxes 124*a* through 124*g* with respect to diagnostic work items, in addition to the eighth work title box 124*h* with respect to a verifying work item. However, the work title boxes 124 may include therein either the first through seventh work title boxes 124*a* through 124*g* or the eighth work title box 124*h*.

In the above embodiment, the work title boxes 124 and the diagnostic result boxes 132 are arranged in a vertical array. However, the layout thereof is not limited to a vertical array, but may be changed as desired.

In the above embodiment, the work title boxes 124 and the diagnostic result boxes 132 are highlighted with the frames thereof being thickened. However, the work title boxes 124 and the diagnostic result boxes 132 may be highlighted in other ways. For example, the background color thereof may be changed (e.g., from blue to orange), blinked, or reversed in color, etc.

In the above embodiment, acquired vehicle data are displayed in the specific work display area 116 (FIG. 6). However, the vehicle data may be displayed in other ways. For example, as shown in FIG. 14, acquired vehicle data may be displayed on a pop-up screen 170. In the example shown in FIG. 14, a data acquisition button 172 is pressed in order to initiate acquisition of vehicle data. At this time, the diagnosing apparatus 16 sends a command for acquiring vehicle data to the inspecting apparatus 14. In response to the command, the inspecting apparatus 14 communicates with the ECU 20 and acquires the vehicle data from the ECU 20, and then sends the vehicle data to the diagnosing apparatus 16. In FIG. 14, three alternatives (alternatives 152*a*, 152*b*, 152*c*) are shown. The display shown in FIG. 14 may be the same as the display that is shown on the display unit 52 of the inspecting apparatus 14. Although not shown in FIG. 14, judging criteria (including one or more judging threshold values) for the vehicle data also are displayed.

In the above embodiment, when the verifying work (the eighth work title box 124*h*) is carried out, the operator operates the inspecting apparatus 14 in order to acquire a diagnostic trouble code. However, the diagnosing apparatus 16 may ask the ECU 20 for a diagnostic trouble code, either directly or via the inspecting apparatus 14, and acquire the diagnostic trouble code from the ECU 20. In this case, the diagnosing apparatus 16 may display on the display unit 80 whether or not a diagnostic trouble code exists.

The invention claimed is:

1. A fault diagnosing method carried out in association with an electronic control unit mounted on a vehicle, for reading self-diagnosis result data stored in the electronic control unit into an external diagnosing apparatus and diagnosing the vehicle for a fault, comprising:
 a diagnostic trouble code reading step of reading a diagnostic trouble code for identifying a faulty event from the electronic control unit into the external diagnosing apparatus; and
 a work guidance step of displaying a work guidance screen for guiding work depending on the read diagnostic trouble code;
 wherein the work guidance screen has:
 an overall work display area including an overall work flowchart, which is made up of a plurality of work items for identifying a faulty spot where the faulty event corresponding to the diagnostic trouble code has occurred, with a selected one of the work items being displayed in highlighted form; and
 a specific work display area representing specific work content corresponding to the work item that is displayed in highlighted form,
 the overall work display area and the specific work display area are juxtaposed to each other;
 the work guidance step comprises:
 displaying alternatives for confirming results of the work items on the work guidance screen; and
 if there is a next work item depending on a selected one of the alternatives, in response to the selection of the one of the alternatives, switching a highlighted display in the overall work display area from the present work item to the next work item that corresponds to the selected one of the alternatives, and displaying specific work content corresponding to the next work item in the specific work display area.

2. The fault diagnosing method according to claim 1, wherein the work items include a plurality of diagnostic work items, and a plurality of repairing work items corresponding to the diagnostic work items; and the work guidance step comprises:

displaying the diagnostic work items and the repairing work items in the overall work display area, and displaying alternatives for confirming results of the diagnostic work items in the specific work display area; and if one of the repairing work items corresponds to a selected one of the alternatives, switching a highlighted display from a present one of the diagnostic work items to the one of the repairing work items in the overall work display area, and displaying specific repairing work content corresponding to the one of the repairing work items in the specific work display area.

3. The fault diagnosing method according to claim 2, wherein the work guidance step comprises:

displaying a verifying work item for verifying results of repairs concerning the repairing work items in addition to the diagnostic work items and the repairing work items in the overall work display area;

if a signal is entered for indicating that a repairing work of one of the repairing work items is finished, switching the highlighted display from a present one of the repairing work items to the verifying work item in the overall work display area, and displaying specific verifying work content corresponding to the verifying work item on the work guidance screen in the specific work display area; and reading the self-diagnosis result data stored in the electronic control unit into the external diagnosing apparatus, and displaying, in the external diagnosing apparatus, whether or not the diagnostic trouble code exists.

4. The fault diagnosing method according to claim 1, wherein the work guidance step comprises:

reading vehicle data required for the specific work content from the electronic control unit into the external diagnosing apparatus, and displaying the vehicle data together with the specific work content in the specific work display area.

5. The fault diagnosing method according to claim 4, wherein the work guidance step comprises:

displaying the vehicle data together with judging criteria with respect to the vehicle data.

6. The fault diagnosing method according to claim 4, wherein the work items include a plurality of diagnostic work items and a plurality of repairing work items corresponding to the diagnostic work items; and the work guidance step comprises:

displaying the diagnostic work items and the repairing work items in the overall work display area, and displaying alternatives for confirming results of the diagnostic work items in the specific work display area; and if one of the repairing work items corresponds to a selected one of the alternatives, switching a highlighted display from a present one of the diagnostic work items to the one of the repairing work items in the overall work display area, and displaying specific repairing work content corresponding to the one of the repairing work items in the specific work display area.

7. The fault diagnosing method according to claim 6, wherein the work guidance step comprises:

displaying a verifying work item for verifying results of repairs concerning the repairing work items in addition to the diagnostic work items and the repairing work items in the overall work display area;

if a signal is entered for indicating that a repairing work of one of the repairing work items is finished, switching the highlighted display from a present one of the repairing work items to the verifying work item in the overall work display area, and displaying specific verifying work content corresponding to the verifying work item on the work guidance screen in the specific work display area; and reading the self-diagnosis result data stored in the electronic control unit into the external diagnosing apparatus, and displaying, in the external diagnosing apparatus, whether or not the diagnostic trouble code exists.

8. A fault diagnosing apparatus connected to an electronic control unit mounted on a vehicle, for reading self-diagnosis result data stored in the electronic control unit and diagnosing the vehicle for a fault, comprising:

a reader for reading a diagnostic trouble code for identifying a faulty event from the electronic control unit; and a display controller for displaying on a display unit a work guidance screen for guiding work depending on the read diagnostic trouble code;

wherein the display controller displays on the work guidance screen:

an overall work display area including an overall work flowchart, which is made up of a plurality of work items for identifying a faulty spot where the faulty event corresponding to the diagnostic trouble code has occurred, with a selected one of the work items being displayed in highlighted form; and a specific work display area representing specific work content corresponding to the work item that is displayed in highlighted form, the overall work display area and the specific work display area are juxtaposed to each other;

the display controller:

displays alternatives for confirming results of the work items on the work guidance screen; and if there is a next work item depending on a selected one of the alternatives, in response to the selection of the alternatives, switches a highlighted display in the overall work display area from the present work item to the next work item that corresponds to the selected one of the alternatives, and displays specific work content corresponding to the next work item in the specific work display area.

9. The fault diagnosing apparatus according to claim 8, wherein the work items include a plurality of diagnostic work items, and a plurality of repairing work items corresponding to the diagnostic work items; and the display controller:

displays the diagnostic work items and the repairing work items in the overall work display area, and displays alternatives for confirming results of the diagnostic work items in the specific work display area; and if one of the repairing work items corresponds to a selected one of the alternatives, switches a highlighted display from a present one of the diagnostic work items to the one of the repairing work items in the overall work display area, and displays specific repairing work content corresponding to the one of the repairing work items in the specific work display area.

10. The fault diagnosing apparatus according to claim 9, wherein the display controller:

displays a verifying work item for verifying results of repairs concerning the repairing work items in addition to the diagnostic work items and the repairing work items in the overall work display area;

if a signal is entered for indicating that a repairing work of one of the repairing work items is finished, switches the highlighted display from a present one of the repairing work items to the verifying work item in the overall work display area, and displays specific verifying work content corresponding to the verifying work item on the work guidance screen in the specific work display area; and reads the self-diagnosis result data stored in the electronic control unit, and displays whether or not the diagnostic trouble code exists.

11. The fault diagnosing apparatus according to claim 8, wherein the display controller:
reads vehicle data required for the specific work content from the electronic control unit, and displays the vehicle data together with the specific work content in the specific work display area.

12. The fault diagnosing apparatus according to claim 11, wherein the display controller displays the vehicle data together with judging criteria with respect to the vehicle data.

13. The fault diagnosing apparatus according to claim 11, wherein the work items include a plurality of diagnostic work items and a plurality of repairing work items corresponding to the diagnostic work items; and
the display controller:
displays the diagnostic work items and the repairing work items in the overall work display area, and displays alternatives for confirming results of the diagnostic work items in the specific work display area; and if one of the repairing work items corresponds to a selected one of the alternatives, switches a highlighted display from a present one of the diagnostic work items to the one of the repairing work items in the overall work display area, and displays specific repairing work content corresponding to the one of the repairing work items in the specific work display area.

14. The fault diagnosing apparatus according to claim 13, wherein the display controller:
displays a verifying work item for verifying results of repairs concerning the repairing work items in addition to the diagnostic work items and the repairing work items in the overall work display area;

if a signal is entered for indicating that a repairing work of one of the repairing work items is finished, switches the highlighted display from a present one of the repairing work items to the verifying work item in the overall work display area, and displays specific verifying work content corresponding to the verifying work item on the work guidance screen in the specific work display area; and reads the self-diagnosis result data stored in the electronic control unit, and displays whether or not the diagnostic trouble code exists.

\* \* \* \* \*